US012769791B1

(12) United States Patent
Garavito-Garzon et al.

(10) Patent No.: US 12,769,791 B1
(45) Date of Patent: Oct. 20, 2026

(54) ENTROPY-BASED GRAPH DENOISING

(71) Applicant: U.S. Bank National Association, Minneapolis, MN (US)

(72) Inventors: Carlos A Garavito-Garzon, Robbinsdale, MN (US); Erik A. Hoversten, Minneapolis, MN (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/396,688

(22) Filed: Nov. 21, 2025

(51) Int. Cl.
*G06F 16/90* (2019.01)
*G06F 16/901* (2019.01)

(52) U.S. Cl.
CPC ................................ *G06F 16/9024* (2019.01)

(58) Field of Classification Search
None
See application file for complete search history.

(56) References Cited

U.S. PATENT DOCUMENTS

2006/0274070 A1* 12/2006 Herman .................. G06T 13/20
345/473
2007/0192306 A1* 8/2007 Papakonstantinou ........................
G06F 16/951
707/999.005
2020/0151288 A1* 5/2020 Ma ........................ G06F 30/327

OTHER PUBLICATIONS

Das et al., Some properties on entropies of graphs, 2017, https://cfc.nankai.edu.cn/_upload/article/files/09/3a/890a6a5c4660ae2350ac183d2dfa/c8bcd5e6-8e94-4648-a0f3-f34d7c623a23.pdf.
Lin et al., On the von Neumann entropy of a graph, Discrete Applied Mathematics, Aug. 14, 2018, https://www.sciencedirect.com/science/article/pii/S0166218X18301999.
Lu et al., Some new properties for degree-based graph entropies, Entropy, 8217-8227, Dec. 16, 2015, https://www.mdpi.com/1099-4300/17/12/7871.
Ortega, Introduction to Graph Signal Processing, Cambridge: Cambridge University Press, Jun. 2022, https://www.amazon.com/Introduction-Signal-Processing-Antonio-Ortega/dp/1108428134.
Ye et al., Approximate von Neumann entropy for directed graphs, Physical Review E, May 2014, https://www.researchgate.net/publication/267741533_Approximate_von_Neumann_entropy_for_directed_graphs.

* cited by examiner

*Primary Examiner* — Jau Shya Meng
(74) *Attorney, Agent, or Firm* — Garg Law Firm, PLLC; Rakesh Garg; Christopher Davis

(57) ABSTRACT

A hop parameter corresponding to a graph representation of input data is set in an entropy-based graph denoising engine. A degree value is computed for a node in the graph. The graph is iteratively traversed from 1 up to the hop parameter. During an iteration, a set of nodes that is at a hop distance of the iteration is extracted, each node in the set is ranked according to a corresponding entropy value, a subset of nodes is selected according to the entropy values, and the remaining nodes are pruned from the graph to form a denoised graph. In an input to a graph search application, the graph is substituted with the denoised graph, causing an output to have a higher relevance with a query directed at the graph as compared to a response based on the graph.

20 Claims, 18 Drawing Sheets

Fig. 5A

502

$$H(G) = -\sum_{i \in V} p_i log p_i$$

*where* $G = (V, E)$ *represents a Graph G with vertices V and edges E and* $p_i$ *is the normalized degree probabiltiy*

Fig. 5B

504

$$H(G) = -Tr(\rho \log(\rho)), with$$

$$\rho = \frac{L}{Tr(L)}$$

$$L = D - A$$

*where A denotes the adjencicy matrix of the graph, D is a diagonal matrix that has the degrees of the nodes. the operator Tr is denotes the trace operator, in the context of matrices is the sum f the diagonal values.*

*Fig. 6*

ALGORITHM 1 NAÏVE ENTROPY SEARCH 600

```
entropy_search (G, node, tol, level)
d_map,←— compute_node_degree(G)   ▶Compute the degree of each node
visited ←— set()                   ▶nodes visited in the algorithm
search_path ←— list(node)          ▶List of nodes in the search
for iter = 1 to level do
        neighbors ←— get_neighbors_at_distance(G, node, iter)
        tmp_patch ←— search_path U neighbors
        loc_node_degree ←— {(deg, node) ε d_map s.t. node ε tmp_patch}
        entropy_per_node ←— compute_entropy(loc_node_degree)
        get_max_entropy_nodes ←— naïve_max(entropy_per_node, tol) ▶Compute
nodes that maximizes entropy in a tolerance
        visited ←— visited U neighbors
        search_path ←— search_path U get_max_entropy_nodes
end for
```

Fig. 7A

704

| START POINT | ONE-HOP (# NODES) | TWO-HOP (# NODES) | THREE-HOP (# NODES) | FOUR-HOP (# NODES) | AVG NODE REDUCTION (%) |
|---|---|---|---|---|---|
| NODE 1 (ENTROPY) | 3 | 37 | 49 | 50 | 63.25 |
| NODE 1 (CLASSICAL) | 2 | 88 | 157 | 182 | |
| NODE 2 (ENTROPY) | 2 | 34 | 65 | 67 | 58.9 |
| NODE 2 (CLASSICAL) | 5 | 82 | 157 | 168 | |
| NODE 3 (ENTROPY) | 3 | 37 | 49 | 50 | 63.25 |
| NODE 3 (CLASSICAL) | 2 | 88 | 157 | 168 | |
| NODE 4 (ENTROPY) | 2 | 5 | 12 | 34 | 58.9 |
| NODE 4 (CLASSICAL) | 2 | 9 | 23 | 122 | |

706

| ALGORITHM TYPE | ONE-HOP | TWO-HOP |
|---|---|---|
| ENTROPY | 79 | 4130 |
| CLASSICAL | 346 | 40959 |

*Fig. 7C*

ENTROPY-BASED GRAPH DENOISING

BACKGROUND

The disclosure relates to the technical field of improving the speed and accuracy of information search while reducing the computing resource usage for the search. More specifically, the disclosure relates to entropy-based graph denoising.

A node is a basic element of a graph that represents an entity or actor, such as a person, device, or transaction. In practice, a node is usually stored as a record or object that contains an identifier (e.g., a unique ID) and may include optional attributes, such as a name, a type, a timestamp, and so on. A common representation is a dictionary or a data structure with a key for the node ID and keys for any attributes, such as {"id": "N123", "type": "account", "balance": 1500}. This format allows quick lookup of a node by its ID and supports easy attachment of additional information that may be useful for graph analysis.

An edge connecting two nodes denotes a relationship or interaction between two entities. The edge is typically represented by a pair of node identifiers together with any associated properties, such as a weight or a timestamp. A typical data format is an edge list where each line or record contains the source node ID, the destination node ID, and optional attributes, for example ("N123", "N456", "weight": 0.8, "type": "transfer"). This representation is useful for computations using relationships and for converting node relationships to other structures like adjacency matrices or lists.

A graph is made up of nodes and edges, and is the overall structure that couples nodes through edges to model relationships. A graph can be represented in several common ways: an adjacency list (a map from each node ID to a list of neighboring node IDs), an adjacency matrix (a 2-D array where entry (i,j) indicates the presence or weight of an edge), or an edge list as described above. For instance, an adjacency list for a small graph might be {"N123": ["N456", "N789"], "N456": ["N123"], "N789": ["N123"]}, which shows that N123 connects to N456 and N789, while N456 and N789 are only connected to N123. This format is useful for graph traversal and is often used in graph libraries.

A "search" in a graph involves starting at one node in the graph, walking along or traversing the edges starting from that node to find a target node, or a set of target nodes, by exploring all nodes that are reachable from the starting node. A visited set of nodes includes those nodes that are visited during a traversal of the graph. A frontier is a collection of nodes that are to be explored next. Breadth-First Search (BFS) is a method of search that explores the graph level by level from the start node. BFS uses a queue to maintain the frontier. Depth-First Search (DFS) is a method of search that explores as far as possible along each branch of traversal before backtracking. DFS is usually implemented recursively or with a stack.

SUMMARY

The present disclosure includes inventive concepts relating generally to improving the performance of software applications, such as methods, systems, and computer programs for entropy-based graph denoising. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method embodiment includes setting, corresponding to a graph representation of input data, a hop parameter in an entropy-based graph denoising engine (denoising engine). The embodiment further includes computing, for a node in the graph, a degree value, wherein the degree value is a number of edges incident to the node in the graph. The embodiment further includes traversing the graph, iteratively from 1 up to the hop parameter, the traversing includes extracting, in an iteration, a set of nodes that is at a hop distance of the iteration; ranking each node in the set of nodes according to a corresponding entropy value; selecting a subset of the set of nodes according to the corresponding entropy values of the nodes in the subset of nodes; and pruning, from the graph to form a denoised graph, every such node from the set of nodes that is not a member of the subset of nodes. The embodiment further includes terminating the traversing when one of (i) all nodes of the graph have been visited, and (ii) a maximum hop distance according to the hop parameter has been reached. The embodiment further includes substituting, in an input to a graph search application, the graph with the denoised graph, the substituting causing an output of the graph search application based on the denoised graph to have a higher relevance with a query directed at the graph as compared to a response based on the graph.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

FIG. 5A depicts an equation to calculate entropy in one example manner in accordance with an illustrative embodiment.

FIG. 5B depicts an equation to calculate entropy in another example manner in accordance with an illustrative embodiment.

FIG. 6 depicts an example algorithm that is usable for accounting for the global relevance of a node in a graph analysis in accordance with an illustrative embodiment.

FIG. 7A depicts the results of a test experiment of the algorithm using example graphs in accordance with an illustrative embodiment. FIG. 7C depicts the results of a test experiment of the algorithm using example graphs in accordance with an illustrative embodiment.

DETAILED DESCRIPTION

Figure 1:
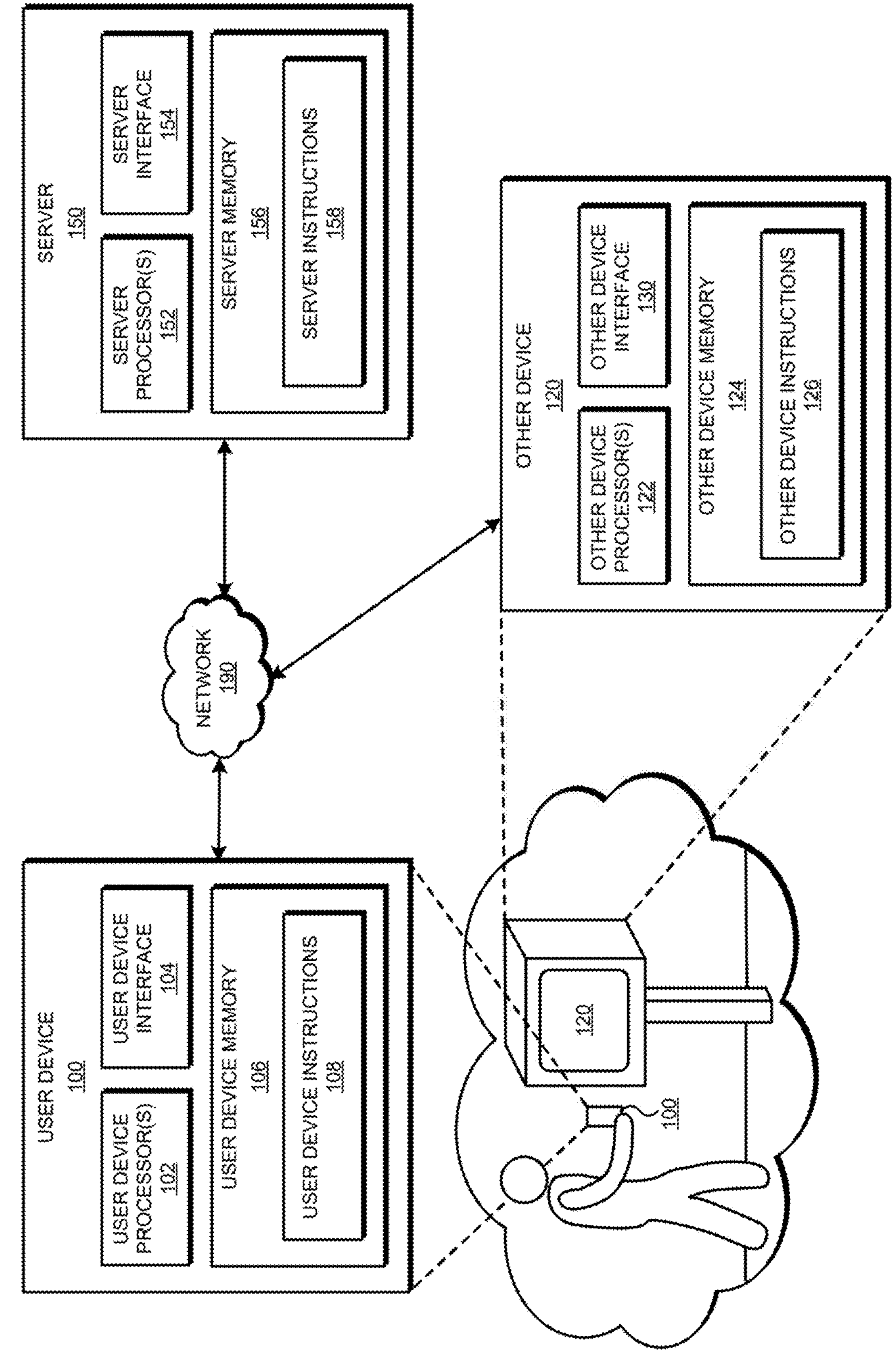
FIG. 1 depicts a block diagram of a computing environment in which an illustrative embodiment may be implemented.

The illustrative embodiments recognize that an underlying data model that generates a graph often creates edges that do not represent real or meaningful relationships between the represented entities. Noise in a graph refers to these edges-edges that satisfy a specified relationship model but do not represent real, meaningful interactions between the represented entities. The illustrative embodiments refer to such edges as "spurious connections," which are created by a relationship model that, although logically consistent, does not correspond to actual interactions in the domain of interest. For example, a phone-network graph may connect two numbers if they exchange more than three calls a week. However, that threshold can cause legitimate numbers to appear close to spam numbers even though no real dynamic exists between them, thus adding false edges that constitute noise. Noise therefore manifests as redundant or superfluous links that inflate the graph's size without adding useful information.

When a graph contains noise, searching the graph becomes difficult and inaccurate because spurious connections expand the reachable neighborhoods of nodes and obscure the true structure. The illustrative embodiments recognize that spurious connections effectively decrease both the information and quality of the data (also known as, signal) stored in the graph. The illustrative embodiments further recognize that the inclusion of such links can lead to loss of accuracy and computational performance when applying models or search algorithms.

The illustrative embodiments recognize that in a search that expands node by node, the presence of many non-informative edges forces the algorithm to traverse many irrelevant paths. Such traversals dilute the relevance of discovered neighbors and potentially cause incorrect inferences about relationships or centrality. Consequently, the illustrative embodiments recognize, the search results are less reliable and may mislead downstream analysis or decision-making processes.

The illustrative embodiments further recognize that noisy graphs are computationally intensive to search. Because each additional edge adds a potential traversal path, the number of nodes examined grows rapidly with each hop. A hop is one step in a graph traversal that connects one node to a directly adjacent node; a one-hop neighbor is a node that is directly connected to the source node, a two-hop neighbor is a node that can be reached by two successive edges, and so on for higher hop counts.

The illustrative embodiments recognize that a classical breadth-first traversal includes all the nodes at distance of one, two, three, . . . n hops, leading to a dramatic increase in the number of connected nodes. This exponential growth not only requires more memory to store intermediate results but also increases the processing time required to compute a result based thereon, thereby straining computational resources and reducing overall system performance.

The illustrative embodiments recognize that graph search is a fundamental operation that is implemented in numerous software tools and technologies, including but not limited to search engines that search for information on the internet or in a given network, fraud detection systems that search voluminous transaction data to identify suspect transactions and suspicious accounts related to such transactions, or sales lead generation systems that search complex data about existing relationships to find upsell and cross-sell opportunities.

The illustrative embodiments recognize that a solution is needed that can improve graph search by optimizing the graph representation of the underlying data. Furthermore, a need exists to improve the performance and accuracy of graph search at a reduced computational cost as compared to the presently available graph search methods. The illustrative embodiments recognize that such a solution is needed to support the ever-enlarging volume of data to be searched, and to deliver search outputs that are more accurate and arrived at faster than the presently available graph search methods.

The illustrative embodiments address these deficiencies of the presently available graph search methods by providing a method, product, and system for entropy-based graph denoising. The various embodiments are described with respect to graph optimization in certain non-limiting example use-cases. An embodiment can be implemented to search graph representations of data in other use cases and deliver similar performance and accuracy improvements.

An ordered graph is a graph in which the connections among nodes are highly regular or predictable, resulting in a low amount of uncertainty. A fully connected graph is an example of an ordered system because every possible pair of nodes is linked, so the graph has very little room to evolve into other configurations.

A disordered graph, by contrast, contains many random or sparse connections, making its structure highly uncertain and capable of evolving into many different configurations. Such a graph is said to possess a high entropy value. A graph with no links has less order and, therefore, higher entropy, while a fully connected graph has no alternative arrangements, implying lower entropy.

This distinction between ordered and disordered graphs underlies the use of entropy as a metric for graph denoising. Graph denoising (denoising) is the process of reducing or eliminating noise, i.e., the spurious or redundant connections that do not reflect real relationships, in a graph, thereby improving accuracy and computational performance when applying models or search algorithms.

Entropy measures and quantifies the uncertainty in the information content of a system. In the context of the illustrative embodiments, entropy is a metric that captures the order or structure of a graph. High-ordered (more predictable) graphs have low entropy, while highly disordered graphs exhibit high entropy. For graphs, the entropy can be computed in two main ways: the Shannon entropy, derived from a probability distribution such as the normalized node degrees, and the Von Neumann entropy, obtained from the graph Laplacian as an analogue to a density matrix in quantum systems.

A naive (naïve) search algorithm, according to the illustrative embodiments, returns the most relevant neighbors using the concept of entropy. The entropy-based pruning of the illustrative embodiments, therefore, mitigates the resource demands while preserving key graph information.

Graph pruning is the selective removal of nodes or edges from a graph in order to reduce its size and eliminate spurious or noisy connections while retaining the essential structure needed for analysis or search. In the illustrative embodiments, pruning is guided by an entropy measure: edges that contribute less than a threshold amount to the global entropy are omitted, yielding a denoised, more compact graph that preserves the most informative relationships.

Global entropy is the entropy value calculated from a probability distribution that represents the entire graph, such as the normalized degree distribution of all nodes or a density derived from the graph Laplacian. This global measure captures how ordered or disordered the whole graph is, reflecting the amount of information that the graph contains as a whole.

By using entropy-based pruning of low-importance edges, the illustrative embodiments dramatically reduce noise and search-space size while improving computational efficiency and explainability of graph analyses. Explainability of a graph analysis or the search result obtained therefrom refers to the extent to which the returned nodes or edges can be understood and justified by a user or analyst. In the illustrative embodiments, reducing noise and pruning less informative connections leads to results that are easier to interpret, because the remaining nodes are those that contribute most to the overall entropy of the graph and thus represent the most significant relationships. This heightened clarity enables users to see why a particular node was selected and how it relates to the search objective, thereby increasing the explainability of the results.

The following is a description of a specific example implementation or experiment of the proposed architecture according to one embodiment. The description of the implementation illustrates the principle of operation of the embodiment using certain example use cases, example data, and corresponding results from the proposed architecture. All trademarks related to any specifically named examples, uses, characters, entities, values, numbers, limits, tools, techniques, models, steps, and operations described or referenced herein belong to their respective owners. The specific examples, uses, characters, entities, values, numbers, limits, tools, techniques, models, steps, and operations are not intended to be limiting. From this disclosure, those of ordinary skill in the art will be able to conceive many other variations of these description artifacts and the same are contemplated within the scope of the illustrative embodiments. The description of the implementation is as follows—

The illustrative embodiments provide a system for denoising a graph data structure by means of an entropy-based pruning algorithm. The system is comprised of the following major components.

1. Graph Store

The graph store maintains a representation of the graph as a collection of nodes and edges. The nodes contain unique identifiers and may store auxiliary attributes. The edges are represented as unordered pairs of node identifiers and may carry an optional weight. The graph store is implemented in main memory using an adjacency list structure for efficient neighbor retrieval.

2. Degree Map Module

The degree map module computes, for each node in the graph, the number of incident edges (the node degree). The module creates a map from node identifier to degree and stores the map in a lookup table. The degree values are used as the basis for generating a probability distribution over nodes.

3. Entropy Calculator

The entropy calculator receives the degree map and normalizes the degrees to produce a probability distribution $p_i=(d_i)/(\Sigma_j d_j)$. The calculator then computes the Shannon entropy $H=-\Sigma_i(p_i \log p_i)$. An alternative implementation may compute the Von Neumann entropy by constructing the normalized Laplacian matrix, computing its eigenvalues, and summing $\lambda_k \log \lambda_k$. The calculator outputs a scalar entropy value for each node and the global entropy of the graph. These examples of entropy calculations are not intended to be limiting. From this disclosure, those of ordinary skill in the art will be able to conceive many other entropy measures and methods of measurements besides Shannon entropy and Von Neumann entropy, and the same are contemplated within the scope of the illustrative embodiments.

4. Search Engine

The search engine accepts a source node, a maximum hop distance (level), and a tolerance value (tol). The search engine performs a traversal, e.g., a breadth-first traversal, up to the specified level. At each hop, the engine extracts the frontier nodes, retrieves their degrees from the degree map, and obtains their entropy values from the entropy calculator. Nodes whose entropy exceeds the maximum entropy in the frontier minus the tolerance are selected and added to the result set.

5. Pruning Module

The pruning module receives the selected nodes from the search engine and constructs a denoised sub-graph. The module retains all selected nodes and the edges among them present in the original graph. All other nodes and edges are discarded.

6. Output Module

The output module presents the denoised sub-graph to downstream consumers. The module may provide the sub-graph in the same adjacency list format as the graph store or serialize it for network transmission. The module can also provide metrics such as the number of nodes removed and the reduction percentage.

B. Functional Operation

1. The system receives a partially-connected graph G=(V, E).
2. The degree map module computes the degree $d_i$ for every node i∈V and stores the mapping $i \rightarrow d_i$
3. The entropy calculator normalizes the degree distribution to obtain probabilities $p_i$ and computes the Shannon entropy $H_i$ for each node.
4. The search engine receives a source node s, a maximum hop distance L, and a tolerance τ.
5. For each hop h from 1 to L, the search engine:
   a. identifies the frontier nodes $F_h$ at distance h from s;
   b. retrieves degrees $d_i$ for all $i \in F_h$;
   c. computes entropy $H_i$ for each $i \in F_h$;
   d. determines the maximum entropy $H_{max}$ within $F_h$;
   e. selects nodes satisfying $H_i > H_{max} - \tau$ and adds them to the result set R.
6. The pruning module constructs a sub-graph G'=(V',E') where V'=R and E'={(i,j)∈E|i,j∈R}.
7. The output module returns G' to the caller.

C. Illustrative Example

Consider a fraud detection graph comprising six nodes labeled A through F and edges {(A,B), (A,C), (B,D), (C,D), (D,E), (E,F)}. Node degrees are: A=2, B=2, C=2, D=3, E=2, F=1. Normalizing these degrees yields probabilities $p_A = p_B = p_C = p_E = 0.266$, $p_D = 0.4$, $p_F = 0.133$. The entropy for each node is calculated as $H_i = -p_i \log p_i$. Assuming a tolerance τ=0.05 and a maximum hop distance L=2, the search engine starts at node A. At hop 1 the frontier is {B,C} with entropies $H_B = H_C$. Both nodes satisfy the tolerance criterion and are added to R. At hop 2 the frontier is {D} with entropy $H_D$. Since Hp exceeds $H_{max} - \tau$, node D is added. The resulting denoised sub-graph contains nodes {A,B,C,D} and edges {(A,B), (A,C), (B,D), (C,D)}. The pruned graph removes nodes E and F, reducing the node count by 33% while preserving the key fraud-related connections.

D. Alternate Embodiments

The degree map module may employ other centrality measures, such as PageRank or betweenness centrality, provided that the chosen measure can be normalized to a probability distribution for entropy computation.

The entropy calculator may implement the Von Neumann entropy by forming the graph Laplacian, normalizing it, and summing $\lambda_k \log \lambda_k$ over its eigenvalues. The Shannon entropy and Von Neumann entropy examples of entropy calculations are not intended to be limiting. From this disclosure, those of ordinary skill in the art will be able to conceive many other entropy measures and methods of measurements besides these non-limiting example methods, and the same are contemplated within the scope of the illustrative embodiments.

The pruning module may accept a variable tolerance that adapts based on local entropy variance, thereby allowing a dynamic selection of nodes.

The graph store may be externalized to a distributed database; the search engine then performs distributed breadth-first traversal with local entropy computation at each node.

The illustrative embodiments provide a system for denoising a graph data structure by means of an entropy-based pruning algorithm. The system is comprised of the following major components.

1. Graph Store

The graph store maintains a representation of the graph as a collection of nodes and edges. The nodes contain unique identifiers and may store auxiliary attributes. The edges are represented as unordered pairs of node identifiers and may carry an optional weight. The graph store is implemented in main memory using an adjacency list structure for efficient neighbor retrieval.

2. Degree Map Module

The degree map module computes, for each node in the graph, the number of incident edges (the node degree). The module creates a map from node identifier to degree and stores the map in a lookup table. The degree values are used as the basis for generating a probability distribution over nodes.

3. Entropy Calculator

The entropy calculator receives the degree map and normalizes the degrees to produce a probability distribution $p_i = (d_i)/(\Sigma_j d_j)$. The calculator then computes the Shannon entropy $H = -\Sigma_i (p_i \log p_i)$. An alternative implementation may compute the Von Neumann entropy by constructing the normalized Laplacian matrix, computing its eigenvalues, and summing $\lambda_k \log \lambda_k$. The calculator outputs a scalar entropy value for each node and the global entropy of the graph.

4. Search Engine

The search engine accepts a source node, a maximum hop distance (level), and a tolerance value (tol). The search engine performs a traversal, e.g., a breadth-first traversal, up to the specified level. At each hop, the engine extracts the frontier nodes, retrieves their degrees from the degree map, and obtains their entropy values from the entropy calculator. Nodes whose entropy exceeds the maximum entropy in the frontier minus the tolerance are selected and added to the result set.

5. Pruning Module

The pruning module receives the selected nodes from the search engine and constructs a denoised sub-graph. The module retains all selected nodes and the edges among them present in the original graph. All other nodes and edges are discarded.

6. Output Module

The output module presents the denoised sub-graph to downstream consumers. The module may provide the sub-graph in the same adjacency list format as the graph store or serialize it for network transmission. The module can also provide metrics, such as the number of nodes removed and the percentage reduction.

B. Functional Operation

1. The system receives a partially-connected graph G=(V, E).
2. The degree map module computes the degree $d_i$ for every node i∈V and stores the mapping $i \rightarrow d_i$
3. The entropy calculator normalizes the degree distribution to obtain probabilities $p_i$ and computes the Shannon entropy $H_i$ for each node.
4. The search engine receives a source node s, a maximum hop distance L, and a tolerance τ.
5. For each hop h from 1 to L, the search engine:
   a. identifies the frontier nodes $F_h$ at distance h from s;
   b. retrieves degrees $d_i$ for all $i \in F_h$;
   c. computes entropy $H_i$ for each $i \in F_h$;
   d. determines the maximum entropy $H_{max}$ within $F_h$;
   e. selects nodes satisfying $H_i \geq H_{max} - \tau$ and adds them to the result set R.
6. The pruning module constructs a sub-graph G'=(V',E') where V'=R and E'={(i,j)∈E|i,j∈R}.

7. The output module returns G' to the caller.

C. Illustrative Example

Consider a fraud detection graph comprising six nodes labeled A through F and edges {(A,B), (A,C), (B,D), (C,D), (D,E), (E,F)}. Node degrees are: A=2, B=2, C=2, D=3, E=2, F=1. Normalizing these degrees yields probabilities $p_A=p_B=p_C=p_E=0.266$, $p_D=0.4$, $p_F=0.133$. The entropy for each node is calculated as $H_i=-p_i \log p_i$. Assuming a tolerance $\tau=0.05$ and a maximum hop distance L=2, the search engine starts at node A. At hop 1 the frontier is {B,C} with entropies $H_B=H_C$. Both nodes satisfy the tolerance criterion and are added to R. At hop 2 the frontier is {D} with entropy $H_D$. Since Hp exceeds $H_{max}-\tau$, node D is added. The resulting denoised sub-graph contains nodes {A,B,C,D} and edges {(A,B), (A,C), (B,D), (C,D)}. The pruned graph removes nodes E and F, reducing the node count by 33% while preserving the key fraud-related connections.

D. Alternate Embodiments

The degree map module may employ other centrality measures, such as PageRank or betweenness centrality, provided that the chosen measure can be normalized to a probability distribution for entropy computation.

The entropy calculator may implement the Von Neumann entropy by forming the graph Laplacian, normalizing it, and summing $\lambda_k \log \lambda_k$ over its eigenvalues.

The pruning module may accept a variable tolerance that adapts based on local entropy variance, thereby allowing a dynamic selection of nodes.

The graph store may be externalized to a distributed database; the search engine then performs a distributed breadth-first traversal with local entropy computation at each node.

The entropy-based graph denoising procedure described herein can be realized with a machine-learning approach by embedding the entropy criteria into a learnable graph model, such as a graph neural network (GNN), and training that model to predict the probability that an edge or a node belongs to the high-entropy, "signal-bearing" portion of the graph.

1. Data preparation—Construct a training set from labeled graphs in which the "clean" (denoised) graph is known. For each node, the entropy value computed by the existing algorithm (Shannon or Von Neumann) is calculated using the global degree map. The training set therefore contains tuples (G, s, e) where G is the noisy graph, s is the binary label for each node (1 if the node is retained after denoising, 0 otherwise), and e is the corresponding entropy value.

2. Model architecture—Use a standard GNN (e.g., Graph Convolutional Network, Graph Attention Network, or Message-Passing Neural Network) whose input features are node embeddings derived from the adjacency matrix or the Laplacian. Include the pre-computed entropy value as an additional feature channel for each node. The GNN learns to propagate local structural information while respecting the global entropy signal.

3. Loss function—Define a supervised loss that encourages the model to assign high scores to nodes that the entropy algorithm would retain. For example, a binary cross-entropy loss can be used with the node labels, optionally weighted by the entropy value to emphasize nodes with very high or very low entropy.

4. Training procedure—Following the machine-learning framework described in FIG. 14, the training method consists of:

Obtain training data—generate noisy graphs and their denoised counterparts using the algorithm in FIG. 6.

Train model—forward-propagate through the GNN, compute the loss, back-propagate, and update parameters until stopping criteria such as validation loss convergence are met.

Validate—evaluate the model on a held-out set to confirm that it reproduces the denoised node set with similar or better accuracy than the rule-based algorithm.

5. Inference—At run time, the trained GNN receives a new partially connected graph, processes it through its layers, and outputs a probability for each node. By selecting nodes whose probability exceeds a threshold (e.g., 0.5), the system produces a pruned graph equivalent to the denoised output of the entropy algorithm but without explicit entropy calculations.

6. Benefits—The learned model captures higher-order structural patterns that may not be evident from entropy alone, potentially improving node selection accuracy and allowing the system to generalize to graphs with different size or density distributions.

Thus, within the scope of the illustrative embodiment, the machine-learning implementation can be used to replace the deterministic entropy-ranking step with a data-driven GNN that learns to approximate the entropy-based pruning decision, using the entropy values as auxiliary supervision during training. This approach leverages the underlying principle of entropy-based importance of an embodiment while enabling scalable, end-to-end learning. Furthermore, within the scope of the illustrative embodiments, one alternate embodiment can be configured to use a GNN trained in how to distinguish noise among a reasonably large sample of graphs and have a GNN-denoiser like architecture. On the other hand, another alternate embodiment can be configured to first denoise the graph and then improve standard GNN tasks such as node, edge, and/or graph classification. In such an embodiment, the disclosed method for denoising a graph serves as a preprocessing of the input data to enhance the node, edges, and/or subgraphs by removing noise in the graph.

End of example implementation or experiment description.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 1300 of FIG. 13. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 1312 of FIG. 13.

The one or more user device interfaces 104 are one or more components of user device 100 that facilitate receiving input from and providing output to something external to user device 100. The one or more user device interfaces 104 can include one or more aspects described below in relation to the one or more interfaces 1318 of FIG. 13.

User device memory 106 is a collection of one or more components of user device 100 configured to store instructions and data for later retrieval and use. User device memory 106 can include one or more aspects described below in relation to memory 1314 of FIG. 13. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal-such as an electronic payment terminal, an automated customer interaction machine or device-such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 1312 of FIG. 13.

Other device memory 124 is a collection of one or more components of other device 120 configured to store instructions and data for later retrieval and use. Other device memory 120 can include one or more aspects described below in relation to memory 1314 of FIG. 13. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 1318 of FIG. 13.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 1312 of FIG. 13.

The one or more server interfaces 154 are one or more components of server 150 that facilitate receiving input from and providing output to something external to server 150. The one or more server interfaces 154 can include one or more aspects described below in relation to the one or more interfaces 1318 of FIG. 13.

Server memory 150 is a collection of one or more components of server 150 configured to store instructions and data for later retrieval and use. Server memory 150 can include one or more aspects described below in relation to memory 1314 of FIG. 13. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2A:
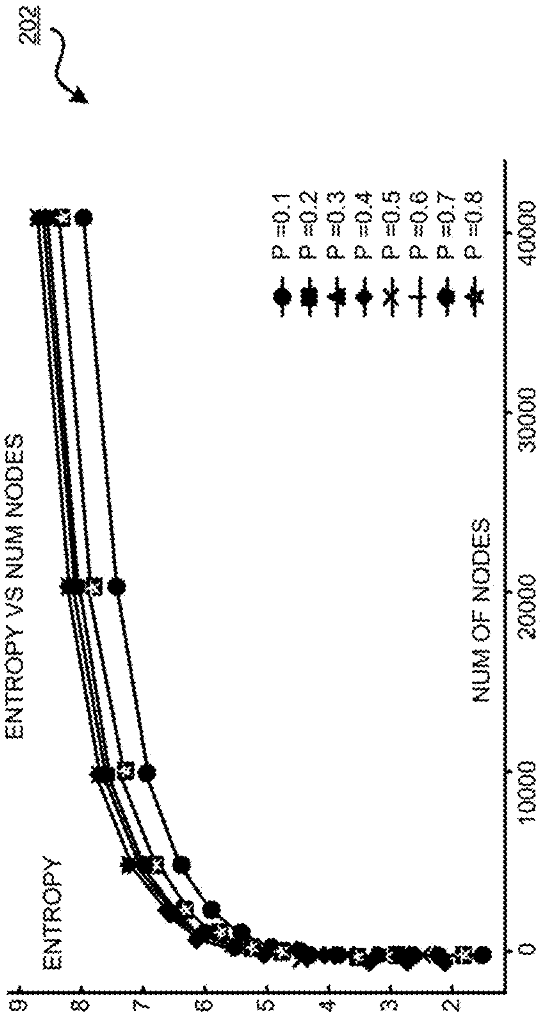
FIG. 2A depicts example comparative entropy-based plots of graphs with different levels of connectivity showing monotonic increase in entropy in accordance with an illustrative embodiment.
Figure 2B:
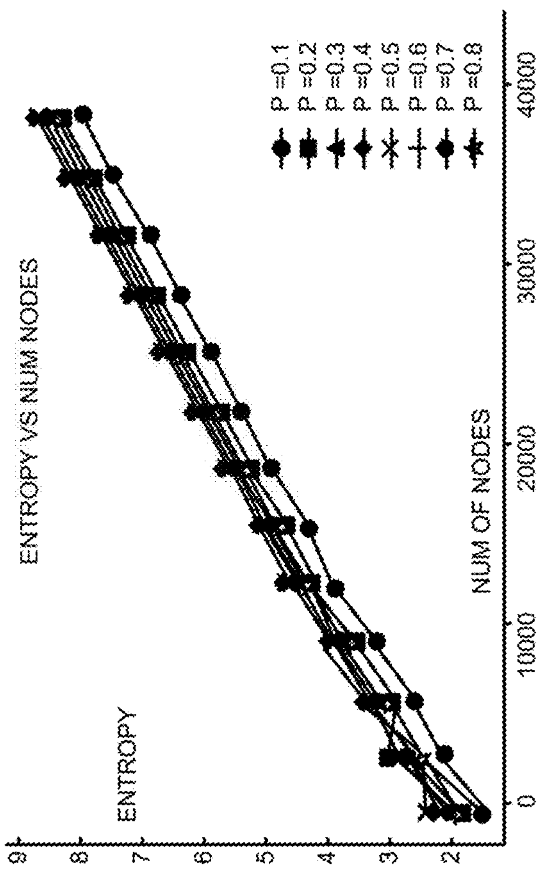
FIG. 2B depicts example comparative entropy-based plots of graphs with different levels of connectivity showing monotonic increase in entropy in accordance with an illustrative embodiment.

FIGS. 2A-2B depict example comparative entropy-based plots of graphs with different levels of connectivity showing monotonic increase in entropy in accordance with an illustrative embodiment.

One of the major challenges in the construction of accurate models or analytics using graphs is redundancy or noise. Noise or redundancy in graphs stem from the underlying data models that construct the graph. This can lead to loss of accuracy and computational performance when applying models or search algorithms. To understand and solve some of these issues, the illustrative embodiments propose an entropy-based approach in which the standard representation of the graph is supplemented with a statistical distribution that accounts for both topology and basic edge-node level information. In this framework noise reduction is achieved by finding a less connected or minimal version.

When defining a graph, a key modeling feature is the creation of a relationship model. In a nutshell, the relationship model will dictate how the nodes will connect or relate among themselves. This is fundamental as the relationship model needs to imprint in the graph the type of relationships that we want to represent from the application. Relationship models tend to be simple but, if not carefully implemented may lead to the generation of spurious connections.

A common solution to this problem is the inclusion of weights in relationships. Weights are a great alternative to quantify the importance of a relationship if data is available. Nonetheless, in many cases weights can impose biases in the network that can lead to wrong hypothesis on the graph. Moreover, sometimes it is hard to quantify certain relationships as they may have no straightforward metrics that are reliable (such as being good friends). To alleviate some of the potential drawbacks the illustrative embodiments propose a novel approach to investigate the network using the concept of entropy in the context of graphs. The illustrative embodiments create an information driven framework using entropy that allows connecting the nodes based not only on their relative distance but on their importance to the graph. Using this approach, the embodiments reduce the total number of connections in a graph or, more importantly, in neighborhoods around nodes of importance. The latter fact is relevant in the context of searches in graph data structures, as it will reduce computational cost and increase the explainability of the results.

To understand the effect of entropy in a graph, consider the following example with an Erdos-Renyi-Graph. This family of graphs in plot 202 and plot 204 is random in nature but can be easily scaled. The graph follows a binomial distribution where the probability p is a parameter that models the chances of nodes being connected among themselves (p=0 for a totally disconnected graph and p=1 fully connected case). The main advantage of this test lies in the fact that embodiments can operate on a graph that is consistent with different levels of connectivity. In FIG. 2A, the entropy vs number of nodes are displayed in plot 202 and entropy vs log (number of nodes) are displayed in plot 204 in FIG. 2B. Plots 202 and 204 show that the selected entropy is monotonically increasing.

Figure 3:
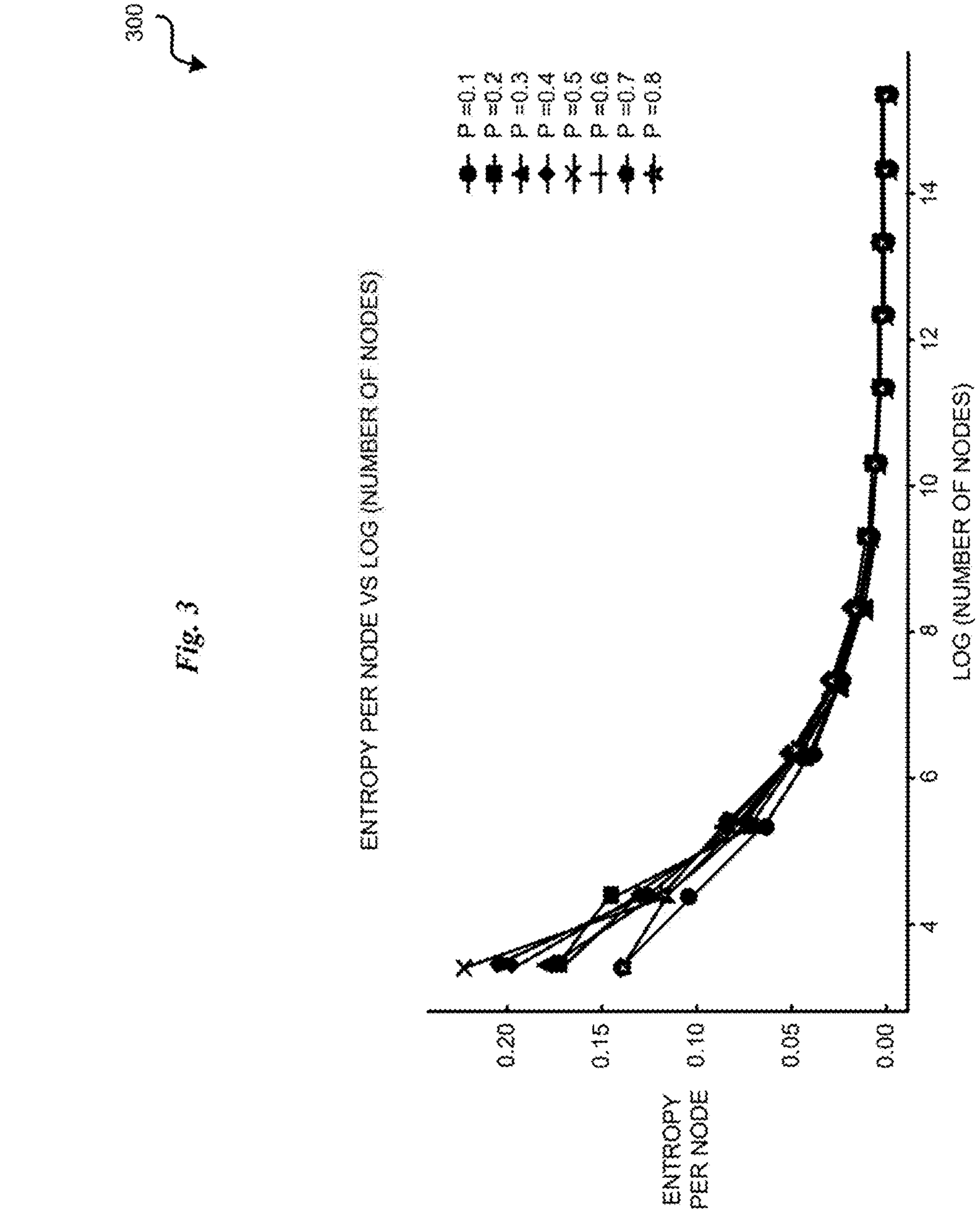
FIG. 3 depicts a plot of entropy per node in accordance with an illustrative embodiment.

FIG. 3 depicts a plot of entropy per node in accordance with an illustrative embodiment. plot 300 depicts entropy per node as function of the logarithm of the number of nodes for several values of p for an example binomial random graph.

Besides the mathematical properties, plot 300 shows that entropy is useful in a graph analysis by showing that adding more nodes and connections at random does not increase the information contained in the graph. In plot 300, the logarithmic scale is used as it shows the effect of size more drastically than regular scales. Plot 300 shows that if the relationship model induces random spurious nodes the effect on the whole data structure is detrimental in terms of the entropy.

Figure 4:
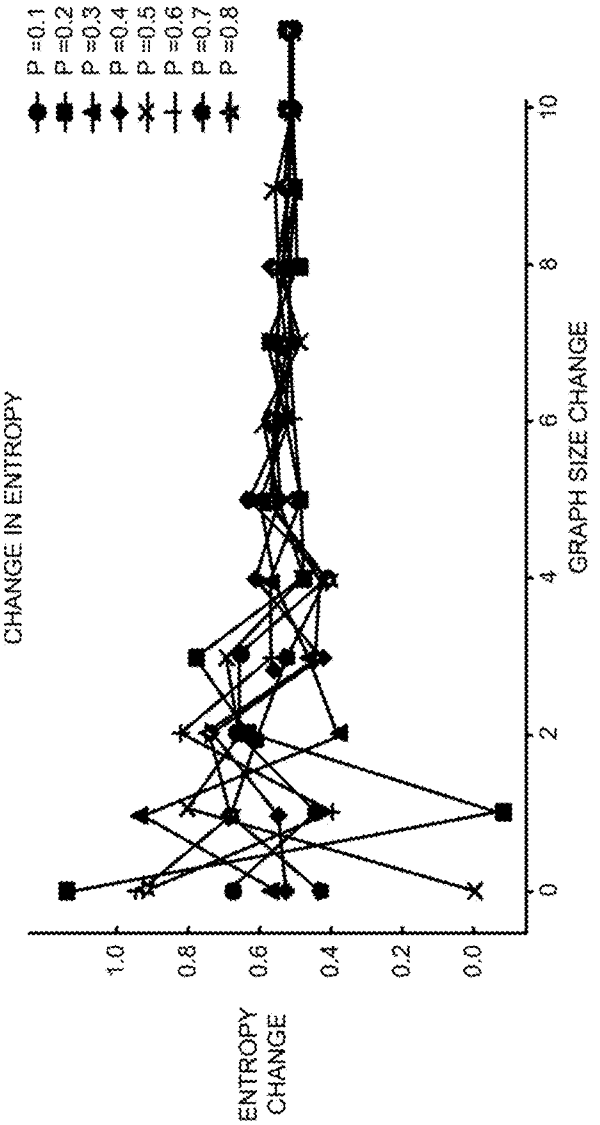
FIG. 4 depicts a plot of change in entropy in accordance with an illustrative embodiment.

FIG. 4 depicts a plot of change in entropy in accordance with an illustrative embodiment. Plot 400 depicts the change in entropy as a function of the change in the number of nodes or graph size change.

In an experiment described earlier, an embodiment generated random binomial graphs doubling the size. If the change in entropy is plotted between two consecutive graphs, the change in entropy should not change if no new information is added by the nodes or connections. This fact is depicted in plot 400, as with a growing change in the number of nodes in the contribution to the entropy stagnates.

FIG. 5A depicts an equation to calculate entropy in one example manner in accordance with an illustrative embodiment.

FIG. 5B depicts an equation to calculate entropy in another example manner in accordance with an illustrative embodiment.

The set of experiments described earlier demonstrate the utility of the concept of entropy for graph analysis. In order to formalize the definition of entropy in graphs, equations 502 and 504 depict two example methods for defining and calculating entropy in graph analysis.

A graph is a complex system where nodes represent actors and links interactions. FIG. 5A-B show how to define entropy in such a system and how to quantify the amount of information in a graph. Entropy in a system can be understood as a measure of the order or structure of the same. High-ordered systems tend to have a low entropy value whereas the entropy values for low-ordered systems are higher. In this sense entropy or information is understood as all possible configurations that a system could achieve given its current state. A set of nodes with no links has less order as theoretically speaking it could evolve to any possible configuration. In contrast, a fully connected graph has no other system to evolve to as all the possible node pairings are part of that state.

The extension of the concept of entropy to graphs is not straight-forward due to the high dimension nature of graphs and their many possible representations (i.e., adjacency matrix, Laplacian, probability distribution, etc.). Two main alternatives for the definition of entropy are depicted; equation 502 is based on the Shannon entropy, and equation 504 shows an extension of the Von Neumann entropy for quantum systems. A key issue is how to transform a graph into a probability like distribution, and each of the depicted methods 502 and 504 uses a different approach. The functional form of entropy depends on the characteristics of the system and on which quantities are selected to measure in the system in question.

Shannon Based Entropy: In this approach the graph is represented by a probability density based on the structure's metrics. The simplest choice is the degree of each node. The degree of each node and the normalize such distribution are computed so that each node has a probability associated therewith—in this case the definition of entropy or information by Shannon can be used as computed using equation 502.

Von Neumann Entropy: This method was originally proposed for computing entropy in quantum systems where the entropy is the trace of the entropy operator. An embodiment adopts it in a novel way in a disconnected and nonobvious context of graphs and graph analysis, where the density of states is replaced by the graph Laplacian due to the relationship of the Laplacian with the adjacency matrix and the degree of each node. The Von Neumann entropy is defined as shown in equation 504.

The illustrative embodiments now focus on the introduction of the Naïve algorithm for entropy search as described herein.

The embodiments introduce a methodology that starts from a given node in graph and returns all the most relevant neighbors using the concept of entropy. In classical graph search algorithms, the method will include all the nodes at distance of one-, two-, three-, . . . , n hops. As the illustrative embodiments recognize, the main drawback of the classical graph search is that the number of connected nodes will increase drastically as more links or hops are included. Based on the experiments on random graphs, this classical approach may include spurious connections. The inclusion of these connections effectively decreases both the information and quality of the signal stored in the graph.

As the algorithm of an embodiment starts from any given node in the graph, the embodiments recognize that using a purely local approach in which the Laplacian or link probability density is estimated with only the local information is unfeasible because by only considering the local picture, all other meaningful connections are lost. Thus, an embodiment ensure that the global relevance of the node is accounted for in local computation.

FIG. 6 depicts an example algorithm that is usable for accounting for the global relevance of a node in a graph analysis in accordance with an illustrative embodiment. Algorithm 600 depicts code or pseudocode of such an algorithm, which is referred to and described as naïve algorithm. Algorithm 600 has a maximization part that only uses the information of each node and not on sets of nodes. The naïve maximization function returns all nodes with the high entropy in the temporary patch between a tolerance (tol). This functionality in algorithm 600 allows for the inclusion of several nodes per iteration.

A patch is a temporary set of nodes that the algorithm examines during one iteration of the search loop. In the entropy-based search, the patch is created by taking the current search path (the nodes already visited) and adding the neighbors that are exactly at the present hop distance. This combined set of nodes is then used to compute per-node entropy values, rank the nodes, and select those whose entropy is within the specified tolerance of the maximum entropy in the patch. The selected nodes are added to the visited set and become part of the next iteration's patch. In this way, the patch represents a local sub-graph of the larger graph that is evaluated at each hop.

Algorithm 600 operates as follows:

The first stage takes as input the graph (G), the node of interest (node), a numerical tolerance (tol), and the maximum hop distance to look (level). The tolerance controls how many nodes can be included at each exploration step and the level the maximum distance that we want to explore in terms of hops.

In the second stage algorithm 600 initializes the map with a degree of each node as quantities used for the definition of entropy. Algorithm 600 computes this at the global level to have information on the relative importance of each node. The search and visited structures will store the relevant nodes and all visited nodes as the graph is traversed, respectively.

The third and main stage of algorithm 600 is the loop over the different nodes found at one-, two-, . . . , n level-hops. A stopping condition is set if the full graph is visited before the loop ending. The components in the loop are as follows:

A. extract the nodes at the given sub-level.

B. create a temporary patch for all nodes to be analyzed.

C. extract the degree of each node from the previously computed degree map for the full graph.

D. using the information on the previous step, compute the entropy by estimating the density or the Laplacian using global metrics.

E. use the numerical tolerance tol to rank order all nodes by entropy in the temporary patch. Select the ones that maximize the entropy in a range. At this stage, quantify the impact of each node to the temporary patch and select the nodes that will make the entropy as high as possible.

F. update the visited and search path structures with the corresponding nodes.

The computation of the entropy uses the degrees of nodes computed at the complete graph level. The node degree passes the relevance of the node to the temporary small patch. For an example implementation, a simple degree of centrality was used, but any type of centrality measure can be used within the scope of the illustrative embodiments, such as page rank, so long such distribution allows for a normalization that can lead to a probability like quantity.

Figure 7B:
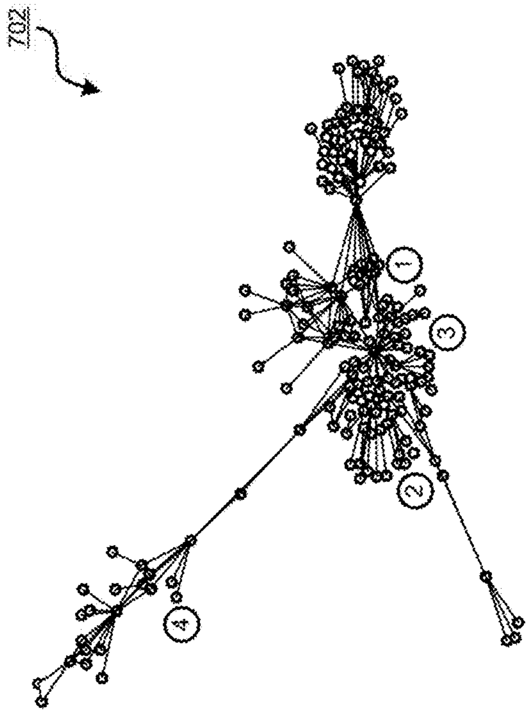
FIG. 7B depicts the results of a test experiment of the algorithm using example graphs in accordance with an illustrative embodiment.

FIGS. 7A, 7B, and 7C depict the results of a test experiment of the algorithm using example graphs in accordance with an illustrative embodiment. algorithm 600 is used in the test experiment. The test experiment focuses on two non-limiting example cases: the first example graph is a standard graph from a fraud detection use-case tailored to determine the algorithm performance in a realistic scenario. In the second example case, the algorithm's performance is tested in a random graph.

Graph 702 represents an entity, such as an account level cluster of customers, related to a fraud use-case. Nodes numbered 1, 2, 3, and 4 represent the different starting points used to test the algorithm with their corresponding labels. The other depicted nodes, as well as the numbered nodes, have the same properties, but the starting points are numbered to highlight their use in the experiment as starting nodes.

Table 704 displays the results using four different starting points. For each point, the algorithm searches nodes at one-, two-, three-, and four-hops (links from source to a given node). Table 704 shows that applying the algorithm reduces the total number of relevant nodes significantly when compared to the classic method (traverse the node, adding all the neighbors at a given distance). The results in Table 704 show a significant reduction in the number of nodes to be searched by the entropy-based method of the embodiments versus the number of nodes to be searched by the classical graph search method.

Table 706 shows the results of the experiment using the algorithm for the random graph test. In this case, the algorithm only considered one-, and two-hops, given the random nature of the graph. The relevant nodes from the entropy approach are still fewer than in the classical case, but the growth is faster than in the previous example shown in Table 704.

The algorithm, according to the illustrative embodiments, shows a significant reduction in the number of relevant neighbors in a search, which reduces the nodes to be explored. The benefits of node reduction and the impact of entropy choices depend on the nature of the initial graph and other parameters, such as the tolerance (tol). In the non-limiting example experiments, the tolerance factor was set to $10^{-4}$, but other values are possible and contemplated within the scope of the illustrative embodiments. Setting the tol to a value of an order of $10^{-4}$—such as ($n*10^{-4}$ wherein n is an integer)—is only a non-limiting example that is desirable under certain circumstances. Setting the tol value to a significantly higher limit, e.g., several orders of magnitude higher—such as ($n*10^{-2}$ wherein n is an integer)—would cause the performance of the algorithm to change substantially—as the tolerance approaches the maximum entropy the algorithm approaches the classical method. If the tolerance is equal to or greater than the maximum entropy there is no difference between the algorithm and the classical method. Thus, the tol parameter provides the noise controlling properties to the algorithm. The value of the tolerance parameter should generally be set at less than the maximum entropy, and depends on the particular graph and aims of the project involving that graph.

Figure 8:
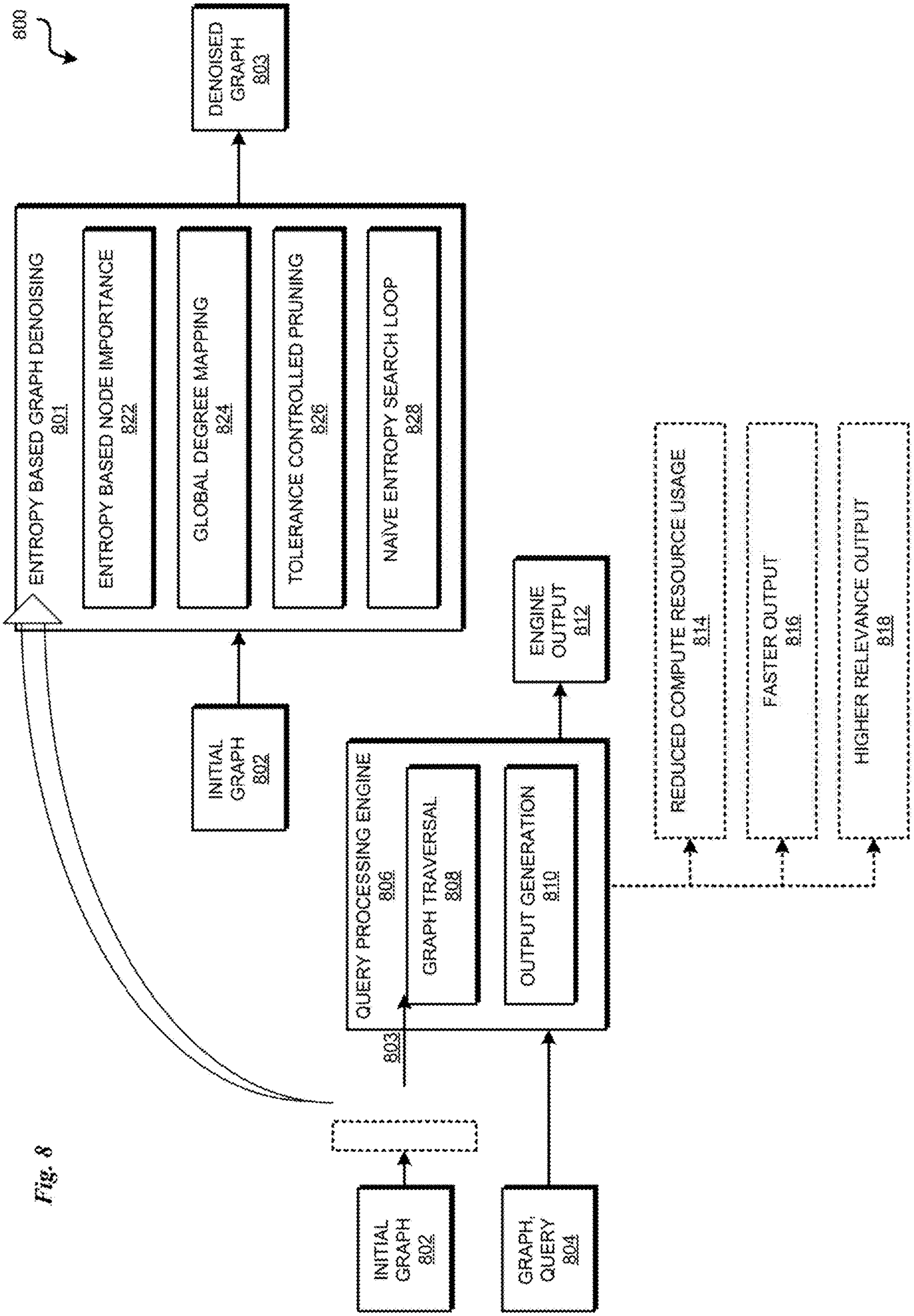
FIG. 8 depicts a block diagram of an example architecture for graph search optimization with entropy-based graph denoising in accordance with an illustrative embodiment.

FIG. 8 depicts a block diagram of an example architecture for graph search optimization with entropy-based graph denoising in accordance with an illustrative embodiment. Architecture 800 includes entropy-based graph denoising engine 801, which accepts as input an initial graph 802, which is a graph representation of data, preferably a partially connected graph representation, as described herein. Engine 801 outputs denoised graph 803, which serves as an improved input graph to any downstream processing engine that uses a graph search operation.

In the depicted example, a generic query processing engine 806 is such a downstream processing engine. Engine

801 according to an embodiment can be deployed, configured, coupled with, or otherwise inserted into the data flow to query processing engine 806 in the manner shown, such as, to intercept initial graph input 802, denoise the initial graph 802, generate denoised graph 803 and inject denoised graph 803 instead of initial graph 802 into query processing engine 806 for further processing.

The further processing in query processing engine 806 may be to process query 804 related to initial graph 802. Instead, query processing engine 806 uses denoised graph 803, performs graph traversal 808 as a part of the processing of query 804, and performs output generation 810 to produce engine output 812.

As a result of the denoising by engine 801, query processing engine 806 is able to perform the processing with a smaller and more relevant graph as compared to initial graph 802. This optimized processing produces output 812 with reduced computations and computing resource usage 814 as compared to if produced by processing initial graph 802, is generated faster (816) as compared to if produced by processing initial graph 802, and output 812 has a higher degree of relevance to query 804 as compared to if produced by processing initial graph 802.

Figure 9:
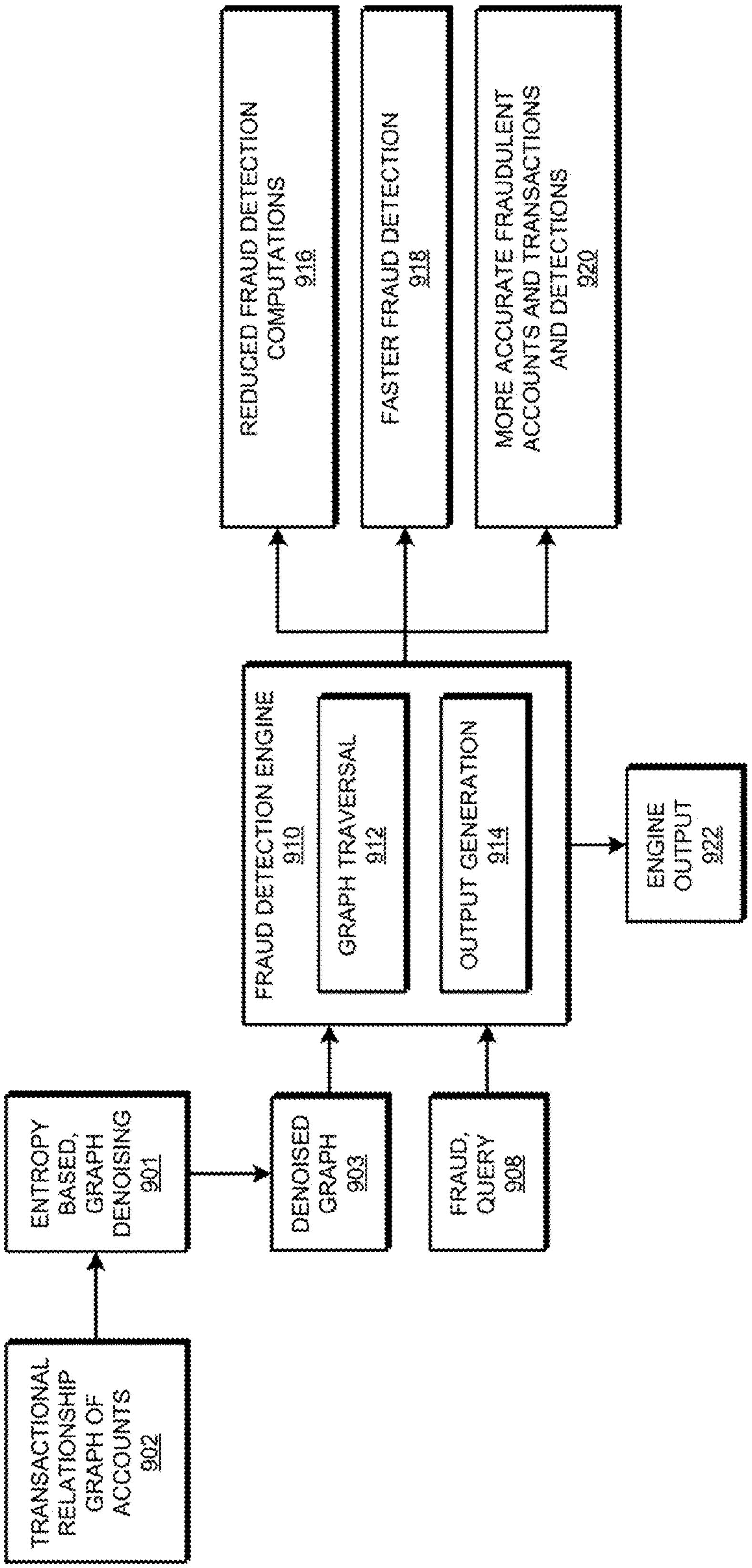
FIG. 9 depicts a block diagram of an example configuration for graph search optimization with entropy-based graph denoising for an example use-case in accordance with an illustrative embodiment.

FIG. 9 depicts a block diagram of an example configuration for graph search optimization with entropy-based graph denoising for an example use-case in accordance with an illustrative embodiment. Configuration 900 is set up for a use-case of fraud detection in financial transactions processed by a financial institution systems.

Configuration 900 includes entropy-based graph denoising engine 901, which is an example of entropy-based graph denoising engine 801 in FIG. 8. Entropy-based graph denoising engine 901 accepts as input graph 902 which represent transaction relationships of accounts configured in the financial institution's system. Engine 901 denoises input graph 902 and produced denoised graph 903 corresponding to the transactional relationship of accounts.

Query 908 is a query related to detecting a fraudulent transaction using the transactional relationships of accounts data. Fraud detection engine 910 uses denoised input 903, performs the processing, including graph traversal 912 on denoised graph 903, and output generation 914. Engine 910 produced output 922 corresponding to query 908. As a result of using denoised graph 903, output 922 is produced with reduced computations and computing resource usage 916 as compared to if produced by processing initial graph 902, is generated faster (918) as compared to if produced by processing initial graph 902, and output 922 has a higher degree of relevance (920) to query 908 as compared to if produced by processing initial graph 902.

Figure 10:
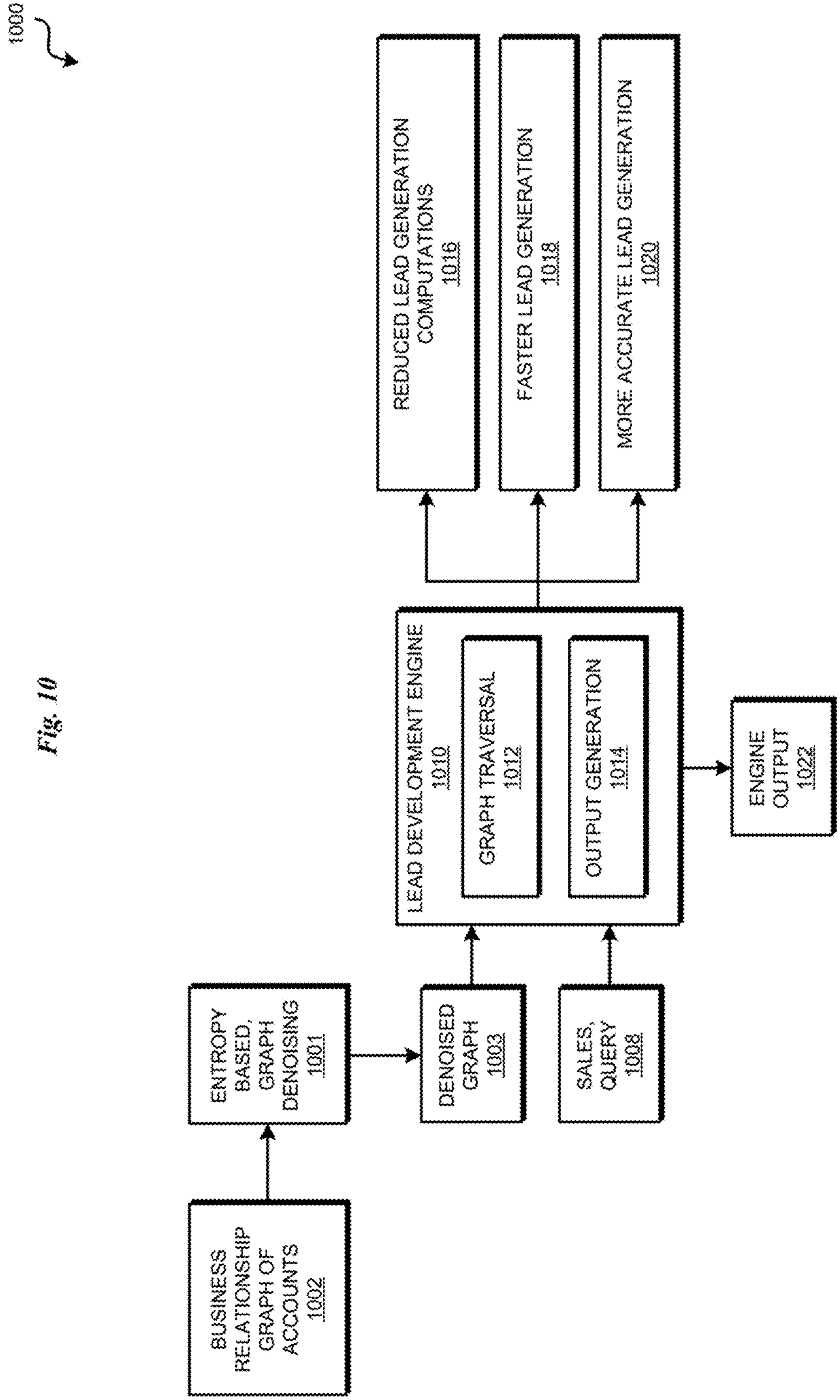
FIG. 10 depicts a block diagram of an example configuration for graph search optimization with entropy-based graph denoising for another example use-case in accordance with an illustrative embodiment.

FIG. 10 depicts a block diagram of an example configuration for graph search optimization with entropy-based graph denoising for another example use-case in accordance with an illustrative embodiment. Configuration 1000 is set up for a use-case of sales leads or business development opportunities generation based on the data of business relationships with a set of accounts in an enterprise data processing system.

Configuration 1000 includes entropy-based graph denoising engine 1001, which is an example of entropy-based graph denoising engine 801 in FIG. 8. Entropy-based graph denoising engine 1001 accepts as input graph 1002, which represents the business relationships of accounts configured in the enterprise data processing system. Engine 1001 denoises input graph 1002 and produces denoised graph 1003 corresponding to the relationship of accounts.

Query 1008 is a query related to identifying sales leads using the relationships of accounts data. Lead development engine 1010 uses denoised input 1003, performs the processing, including graph traversal 1012 on denoised graph 1003, and output generation 1014. Engine 1010 produced output 1022 corresponding to query 1008. As a result of using denoised graph 1003, output 1022 is produced with reduced computations and computing resource usage 1016 as compared to if produced by processing initial graph 1002, is generated faster (1018) as compared to if produced by processing initial graph 1002, and output 1022 has a higher degree of relevance (1020) to query 1008 as compared to if produced by processing initial graph 1002.

Figure 11:
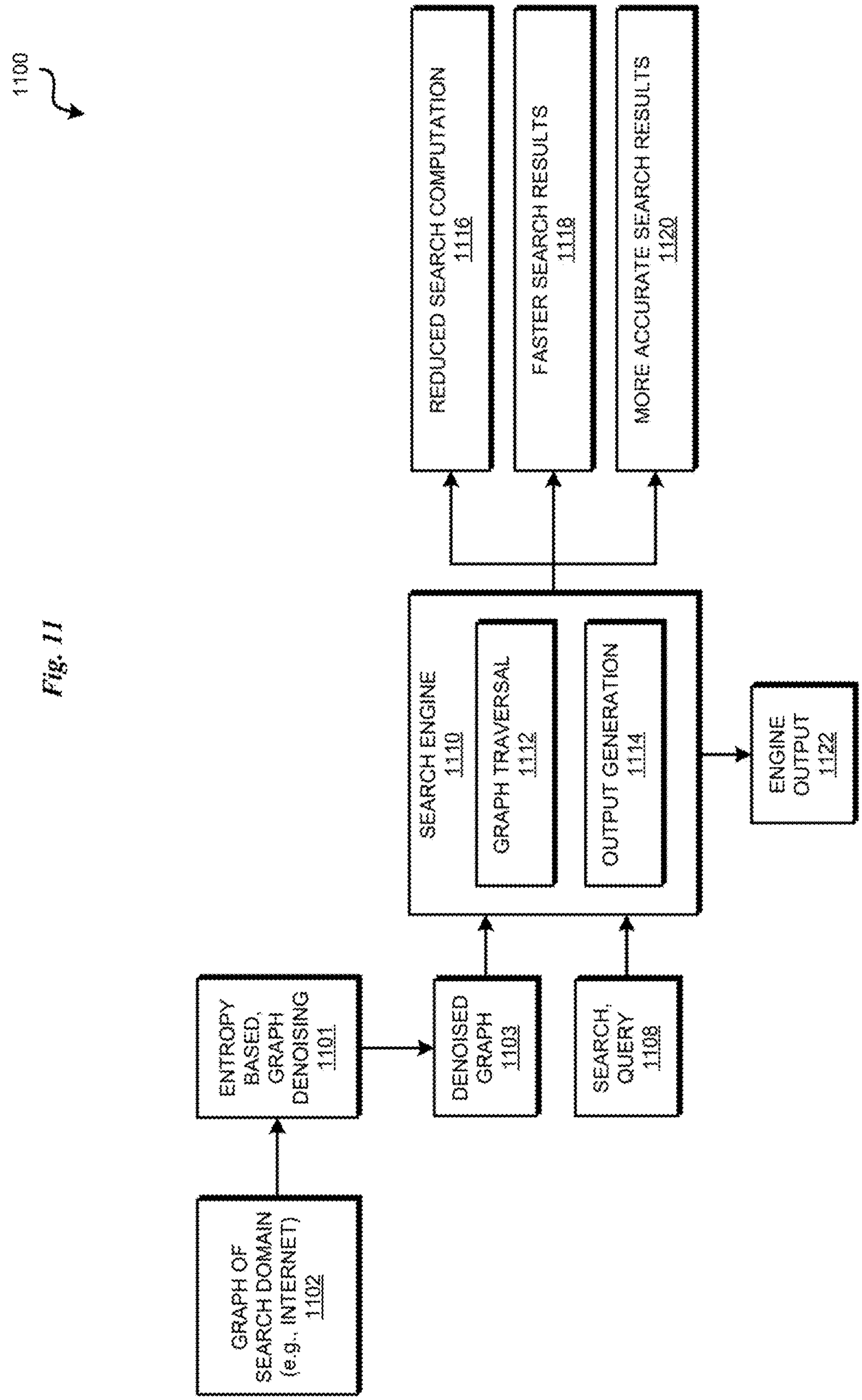
FIG. 11 depicts a block diagram of an example configuration for graph search optimization with entropy-based graph denoising for another example use-case in accordance with an illustrative embodiment.

FIG. 11 depicts a block diagram of an example configuration for graph search optimization with entropy-based graph denoising for another example use-case in accordance with an illustrative embodiment. Configuration 1100 is set up for a use-case of information searching based on the data available in a search domain, such as the internet or in the systems of a local data network.

Configuration 1100 includes entropy-based graph denoising engine 1101, which is an example of entropy-based graph denoising engine 801 in FIG. 8. Entropy-based graph denoising engine 1101 accepts as input graph 1102 which represent the to-be-searched data of the search domain. Engine 1101 denoises input graph 1102 and produced denoised graph 1103 corresponding to the relationship of accounts.

Query 1108 is a search query related to finding some information using the data of the search domain. Search engine 1110 uses denoised input 1103, performs the processing, including graph traversal 1112 on denoised graph 1103, and output generation 1114. Engine 1110 produced output 1122 corresponding to query 1108. As a result of using denoised graph 1103, output 1122 is produced with reduced computations and computing resource usage 1116 as compared to if produced by processing initial graph 1102, is generated faster (1118) as compared to if produced by processing initial graph 1102, and output 1122 has a higher degree of relevance (1120) to query 1108 as compared to if produced by processing initial graph 1102.

Figure 12:
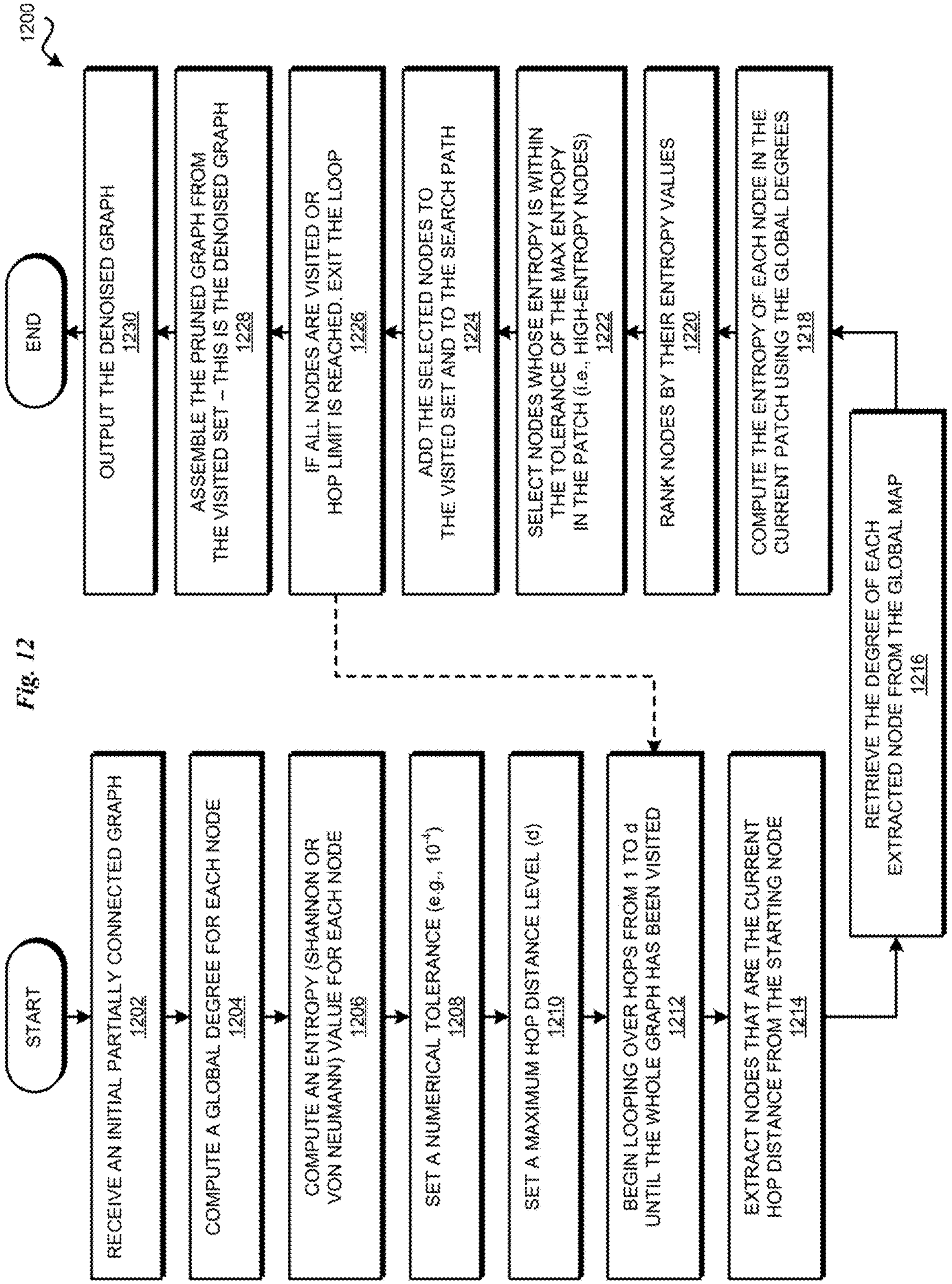
FIG. 12 depicts a flow diagram of a method for denoising a graph by iteratively pruning nodes based on entropy in accordance with an illustrative embodiment.

FIG. 12 depicts a flow diagram of a method for denoising a graph by iteratively pruning nodes based on entropy in accordance with an illustrative embodiment. process 1200 can be implemented in engine 801 in FIG. 8.

The process receives an initial partially connected graph (block 1202). The process computes a global degree for each node in the graph (block 1204). The process computes an entropy value for each node, using either Shannon or Von Neumann entropy, based on the node degrees (block 1206). The process sets a numerical tolerance, for example a non-limiting example value of $10^{-4}$, to control node selection (block 1208). The process sets a maximum hop distance level, denoted by d, for the search (block 1210).

The process begins looping over hops from 1 to d, continuing until the whole graph has been visited (block 1212). The process extracts nodes that are the current hop distance from the starting node (block 1214). The process ranks the extracted nodes by their entropy values (block 1216). The process selects nodes whose entropy is within the tolerance of the maximum entropy in the current patch (block 1222).

The process adds the selected nodes to the visited set and to the search path (block 1224). When all nodes are visited or the hop limit is reached, the process proceeds to block 1228. If all nodes have not yet been visited or the hop limit has not been reached, the process returns to block 1212.

The process assembles the pruned graph from the visited set, producing the denoised graph (block 1228). The process outputs the denoised graph (block 1230). The process ends thereafter.

Figure 13:
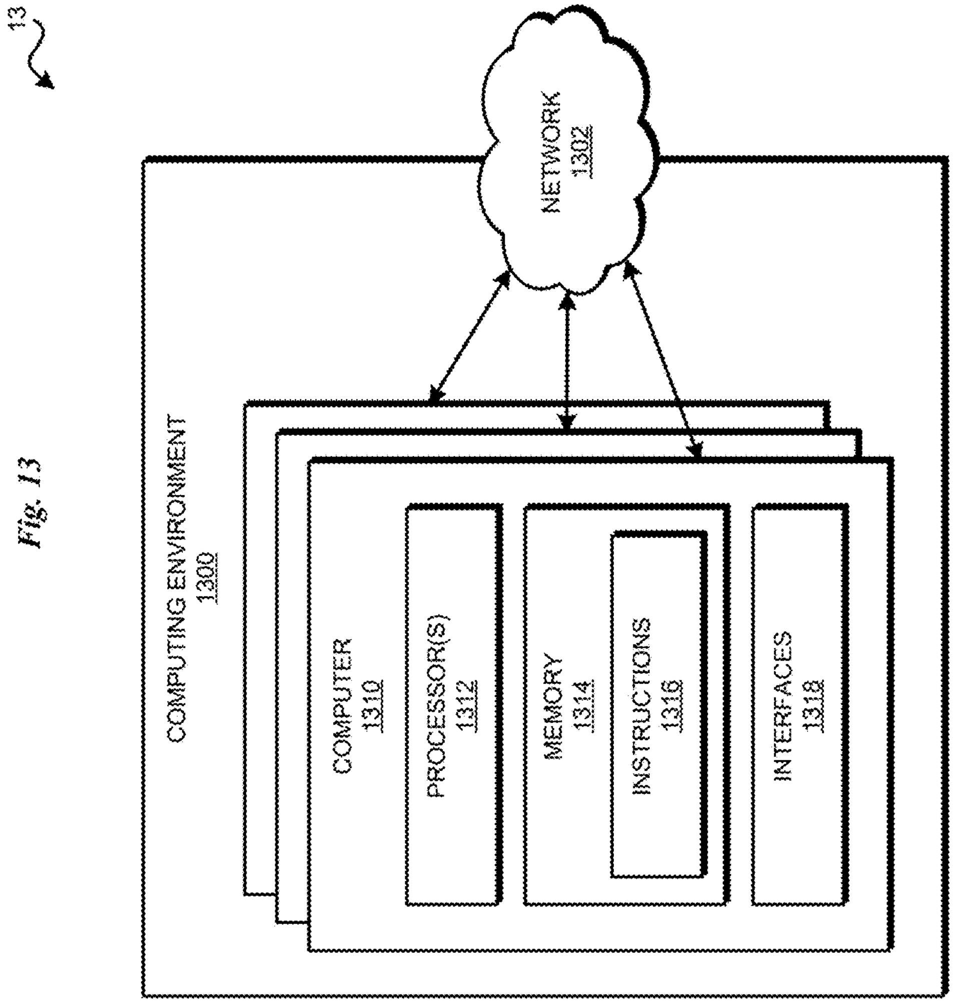
FIG. 13 depicts a data processing environment in which aspects of the present disclosure may be implemented.

FIG. 13 depicts a data processing environment 20 in which aspects of the present disclosure may be implemented. Computing environment 1300 is a set of one or more virtual or physical computers 1310 that individually or in cooperation achieve tasks, such as implementing one or more aspects described herein. Computers 1310 have components that cooperate to cause output based on input. Example computers 1310 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 1300 includes at least one physical computer.

Computing environment 1300 may specifically be used to implement one or more aspects described herein. In some examples, one or more of computers 1310 may be implemented as a user device, such as mobile device and others of computers 1310 may be used to implement aspects of a machine learning framework useable to train and deploy models exposed to the mobile device or provide other functionality, such as through exposed application programming interfaces.

Computing environment 1300 can be arranged in any of a variety of ways. Computers 1310 can be local to or remote from other computers 1310 of environment 1300. Computing environment 1300 can include computers 1310 arranged according to client-server models, peer-to-peer models, edge computing models, other models, or combinations thereof.

In many examples, computers 1310 are communicatively coupled with devices internal or external to computing environment 1300 via network 1302. Network 1302 is a set of devices that facilitate communication from a sender to a destination, such as by implementing communication protocols. Example networks 1302 include local area networks, wide area networks, intranets, or the Internet.

In some implementations, computers 1310 can be general-purpose computing devices (e.g., consumer computing devices). In some instances, via hardware or software configuration, computers 1310 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1310 include one or more processors 1312, memory 1314, and one or more interfaces 1318. Such components can be virtual, physical, or combinations thereof.

The one or more processors 1312 are components that execute instructions, such as instructions that obtain data, process the data, and provide output based on the processing. The one or more processors 1312 often obtain instructions and data stored in memory 1314. The one or more processors 1312 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1312 include at least one physical processor implemented as an electrical circuit. Example providers of processors 1312 include INTEL, AMD, QUALCOMM, TEXAS INSTRUMENTS, and APPLE.

Memory 1314 is a collection of components configured to store instructions 1316 and data for later retrieval and use. Instructions 1316 can, when executed by the one or more processors 1312, cause execution of one or more operations that implement aspects described herein. In many examples, memory 1314 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof.

The one or more interfaces 1318 are components that facilitate receiving input from and providing output to something external to computer 1310, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1318 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1318 can facilitate connection of computing environment 1300 to network 1390.

Computers 1310 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Figure 14:
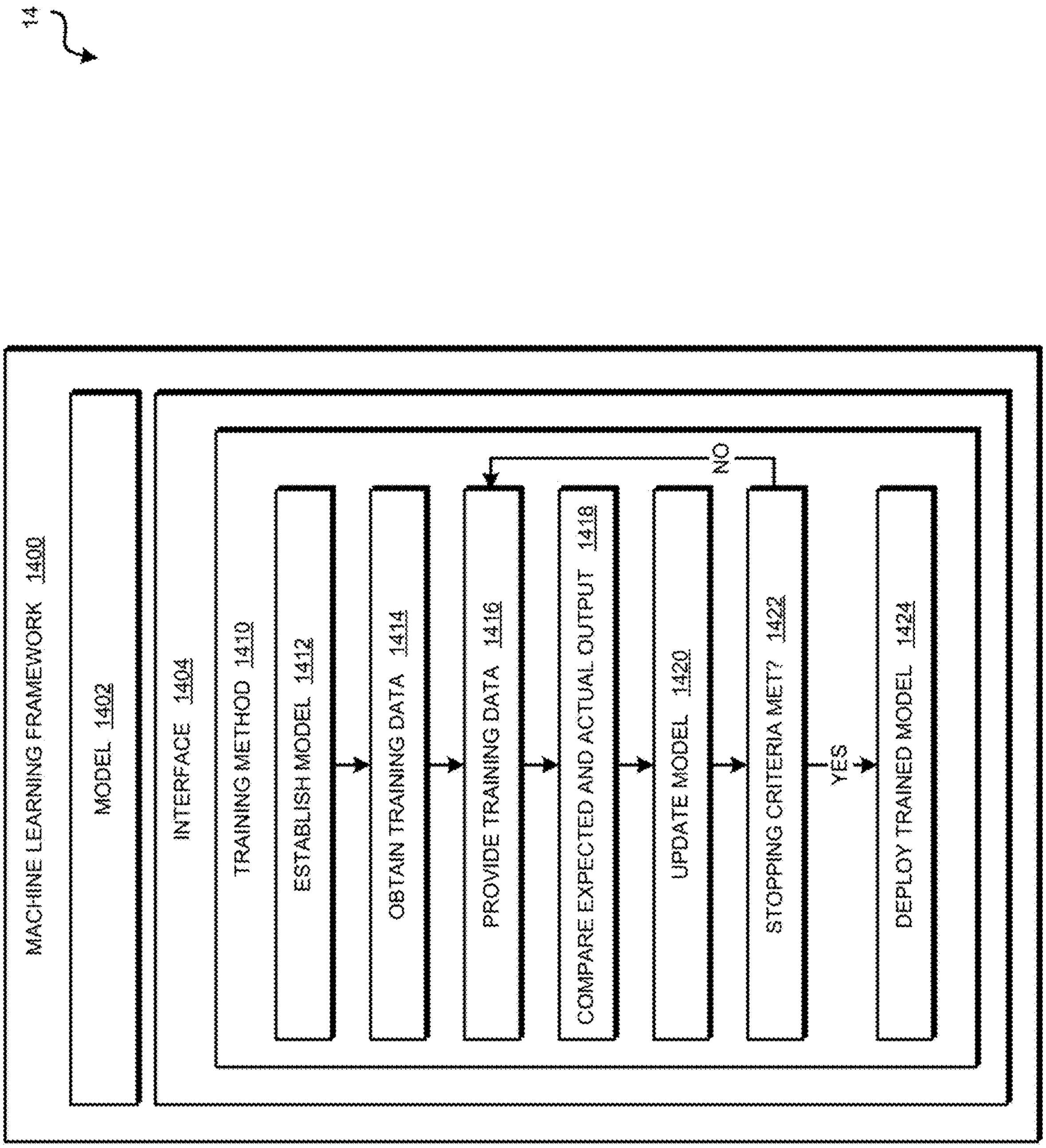
FIG. 14 depicts a configuration for machine learning in which aspects of the present disclosure may be implemented.

FIG. 14 illustrates an example machine learning framework 1400 that techniques described herein may benefit from or improve on. A machine learning framework 1400 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1400 or components thereof are often built or refined from existing frameworks, such as TENSORFLOW by GOOGLE, INC., or PYTORCH by the PYTORCH community.

The machine learning framework 1400 can include one or more models 1402 that are the structured representation of learning and an interface 1404 that supports use of the model 1402.

The model 1402 can take any of a variety of forms. In many examples, the model 1402 includes representations of nodes (e.g., neural network nodes, decision tree nodes, Markov model nodes, other nodes, or combinations thereof) and connections between nodes (e.g., weighted, or unweighted unidirectional or bidirectional connections). In certain implementations, the model 1402 can include a representation of memory (e.g., providing long short-term memory functionality). Where the set includes more than one model 1402, the models 1402 can be linked, cooperate, or compete to provide output.

The interface 1404 can include software procedures (e.g., defined in a library) that facilitate the use of the model 1402, such as by providing a way to establish and interact with the model 1402. For instance, the software procedures can include software for receiving input, preparing input for use (e.g., by performing vector embedding, such as using Word2Vec, BERT, or another technique), processing the input with the model 1402, providing output, training the model 1402, performing inference with the model 1402, fine tuning the model 1402, other procedures, or combinations thereof.

In an example implementation, interface 1404 can be used to facilitate a training method 1410 that can include operation 1412. Operation 1412 includes establishing a model 1402, such as initializing a model 1402. The establishing can include setting up the model 1402 for further use (e.g., by training or fine tuning). The model 1402 can be initialized with values. In examples, the model 1402 can be pretrained. Operation 1414 can follow operation 1412. Operation 1414 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1402. Operation 1416 can follow operation 1414. Operation 1416 includes providing a portion of the training data to the model 1402. This can include providing the training data in a format usable by the model 1402. The framework 1400 (e.g., via the interface 1404) can cause the model 1402 to produce an output based on the input. Operation 1418 can follow operation 1416. Operation 1418 includes comparing the expected output with the actual output. In an example, this can include applying a loss function to determine the difference between expected and actual. This value can be used to determine how training is progressing. Operation 1420 can follow operation 1418. Operation 1420 includes updating the model 1402 based on the result of the comparison. This can take any of a variety of forms depending on the nature of the model 1402. Where the model 1402 includes weights, the weights can be modified to increase the likelihood that the model 1402 will produce correct output given an input. Depending on the model 1402, backpropagation or other techniques can be used to update the model 1402. Operation 1422 can follow operation 1420. Operation 1422 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1414. If the stopping criterion has been satisfied, the flow can move to operation 1422. Operation 1422 includes deploying the trained model 1402 for use in production, such as providing the trained model 1402 with real-world input data and produce output data used in a real-world process. The model 1402 can be stored in memory 1314 of at least one computer 1310, or distributed across memories of two or more such computers 1310 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±13% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:

loading, in a graph store configured in a memory using an adjacency list structure, a representation of input data as a graph, wherein the graph store facilitates a neighbor retrieval operation on the graph;

setting, in the graph store in the memory, and corresponding to the graph of input data, a hop parameter in an entropy-based graph denoising engine (denoising engine);

computing, for a node in the graph, a degree value, wherein the degree value is a number of edges incident to the node in the graph;

traversing the graph, iteratively from 1 up to the hop parameter, the traversing comprising:

extracting, from the adjacency list structure in memory using the neighbor retrieval operation, in an iteration, a set of nodes that is at a hop distance of the iteration;

ranking each node in the set of nodes according to a corresponding entropy value;

selecting a subset of the set of nodes according to the corresponding entropy values of the nodes in the subset of nodes; and pruning, by discarding from the graph in the adjacency list structure in the memory, to form a denoised graph, every such node from the set of nodes that is not a member of the subset of nodes;

terminating the traversing responsive to one of (i) all nodes of the graph having been visited, and (ii) a maximum hop distance according to the hop parameter having been reached;

outputting the denoised graph to a graph search application as one of (i) the adjacency list structure in the memory and (ii) a serialized form in a network transmission; and substituting, in an input to the graph search application, the graph with the denoised graph, the substituting causing an output of the graph search application based on the denoised graph to have a higher relevance with a query directed at the graph as compared to a response based on the graph.

2. The computer-implemented method of claim 1, wherein the substituting further causes the output of the graph search application to be produced faster than the response based on the graph.

3. The computer-implemented method of claim 1, wherein the substituting further causes the output of the graph search application to be produced with fewer computations than the response based on the graph.

4. The computer-implemented method of claim 1, further comprising:

adding the subset of nodes to a visited set of nodes; and adding the subset of nodes to the search path.

5. The computer-implemented method of claim 1, wherein the selecting the subset of nodes comprises selecting those nodes from the set of nodes whose corresponding entropy values are within a tolerance parameter of a maximum entropy value in the set of nodes.

6. The computer-implemented method of claim 1, wherein the hop parameter controls a distance traversed in the graph from the node.

7. The computer-implemented method of claim 1, further comprising:

computing, based on the degree value, an entropy of the node.

8. The computer-implemented method of claim 1, further comprising:

setting the tolerance parameter in the denoising engine, wherein the tolerance parameter controls an amount of noise pruned from the graph.

9. The computer-implemented method of claim 8, wherein increasing the tolerance parameter value reduces the amount of noise pruned from the graph.

10. The computer-implemented method of claim 8, wherein as the tolerance parameter is less than a maximum entropy of the graph.

11. The computer-implemented method of claim 1, wherein the corresponding entropy value of a node in the set of nodes is computed using Shannon entropy-based on the normalized degree distribution of the nodes in the set of nodes.

12. The computer-implemented method of claim 1, wherein the entropy value of a node in the set of nodes is computed using Von Neumann entropy-based on a graph Laplacian matrix.

13. The computer program product of claim 10, wherein the stored program instructions are stored in a computer readable storage device in a data processing system, and wherein the stored program instructions are transferred over a network from a remote data processing system.

14. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, the operations further comprising:

metering a use of the program instructions associated with the request; and generating an invoice based on the use.

15. A computer program product comprising one or more computer readable storage media, and program instructions collectively stored on the one or more computer readable storage media, the program instructions executable by a set of one or more processors to cause the set of one or more processors to perform operations comprising:

loading, in a graph store configured in a memory using an adjacency list structure, a representation of input data as a graph, wherein the graph store facilitates a neighbor retrieval operation on the graph;

setting, in the graph store in the memory, and corresponding to the graph of input data, a hop parameter in an entropy-based graph denoising engine (denoising engine);

computing, for a node in the graph, a degree value, wherein the degree value is a number of edges incident to the node in the graph;

traversing the graph, iteratively from 1 up to the hop parameter, the traversing comprising:

extracting, from the adjacency list structure in memory using the neighbor retrieval operation, in an iteration, a set of nodes that is at a hop distance of the iteration;

ranking each node in the set of nodes according to a corresponding entropy value;

selecting a subset of the set of nodes according to the corresponding entropy values of the nodes in the subset of nodes; and pruning, by discarding from the graph in the adjacency list structure in the memory, to form a denoised graph, every such node from the set of nodes that is not a member of the subset of nodes;

terminating the traversing responsive to one of (i) all nodes of the graph having been visited, and (ii) a maximum hop distance according to the hop parameter having been reached;

outputting the denoised graph to a graph search application as one of (i) the adjacency list structure in the memory and (ii) a serialized form in a network transmission; and substituting, in an input to the graph search application, the graph with the denoised graph, the substituting causing an output of the graph search application based on the denoised graph to have a higher relevance with a query directed at the graph as compared to a response based on the graph.

16. The computer program product of claim 15, wherein the substituting further causes the output of the graph search application to be produced faster than the response based on the graph.

17. The computer program product of claim 15, wherein the substituting further causes the output of the graph search application to be produced with fewer computations than the response based on the graph.

18. The computer program product of claim 15, the operations further comprising:

adding the subset of nodes to a visited set of nodes; and adding the subset of nodes to the search path.

19. The computer program product of claim 15, wherein the selecting the subset of nodes comprises selecting those nodes from the set of nodes whose corresponding entropy values are within a tolerance parameter of a maximum entropy value in the set of nodes.

20. A computer system comprising a set of one or more processors and one or more computer readable storage media, and program instructions collectively stored on the one or more computer readable storage media, the program instructions executable by the set of one or more processors to cause the set of one or more processors to perform operations comprising:

loading, in a graph store configured in a memory using an adjacency list structure, a representation of input data as a graph, wherein the graph store facilitates a neighbor retrieval operation on the graph;

setting, in the graph store in the memory, and corresponding to the graph of input data, a hop parameter in an entropy-based graph denoising engine (denoising engine);

computing, for a node in the graph, a degree value, wherein the degree value is a number of edges incident to the node in the graph;

traversing the graph, iteratively from 1 up to the hop parameter, the traversing comprising:

extracting, from the adjacency list structure in memory using the neighbor retrieval operation, in an iteration, a set of nodes that is at a hop distance of the iteration;

ranking each node in the set of nodes according to a corresponding entropy value;

selecting a subset of the set of nodes according to the corresponding entropy values of the nodes in the subset of nodes; and pruning, by discarding from the graph in the adjacency list structure in the memory, to form a denoised graph, every such node from the set of nodes that is not a member of the subset of nodes;

terminating the traversing responsive to one of (i) all nodes of the graph having been visited, and (ii) a maximum hop distance according to the hop parameter having been reached;

outputting the denoised graph to a graph search application as one of (i) the adjacency list structure in the memory and (ii) a serialized form in a network transmission; and substituting, in an input to the graph search application, the graph with the denoised graph, the substituting causing an output of the graph search application based on the denoised graph to have a higher relevance with a query directed at the graph as compared to a response based on the graph.

* * * * *